(12) United States Patent
Lo et al.

(10) Patent No.: US 11,182,487 B2
(45) Date of Patent: Nov. 23, 2021

(54) TESTING INSTRUMENTATION FOR INTRUSION REMEDIATION ACTIONS

(71) Applicant: Microsoft Technology Licensing, LLC, Redmond, WA (US)

(72) Inventors: Kevin Lo, Redmond, WA (US); Daiqian Hu, Shanghai (CN); Hongquan Yin, Suzhou (CN); Lei He, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 426 days.

(21) Appl. No.: 16/037,380

(22) Filed: Jul. 17, 2018

(65) Prior Publication Data

US 2020/0026861 A1 Jan. 23, 2020

(51) Int. Cl.
  *H04L 29/06* (2006.01)
  *G06F 21/57* (2013.01)
  *G06F 21/55* (2013.01)
  *G06F 21/56* (2013.01)

(52) U.S. Cl.
  CPC .......... *G06F 21/577* (2013.01); *G06F 21/554* (2013.01); *G06F 21/566* (2013.01); *G06F 21/568* (2013.01)

(58) Field of Classification Search
  CPC ........... G06F 21/45; G06F 21/50; G06F 21/53
  See application file for complete search history.

(56) References Cited

U.S. PATENT DOCUMENTS

| | | |
|---|---|---|
| 9,009,542 B1 | 4/2015 | Marr et al. |
| 9,304,650 B2 | 4/2016 | Whitlock et al. |
| 9,304,850 B1 | 4/2016 | Whitlock et al. |
| 9,354,997 B2 | 5/2016 | Marr et al. |
| 9,509,554 B1 | 11/2016 | Whitlock et al. |
| 2008/0201722 A1* | 8/2008 | Sarathy ............... G06F 21/6209 719/311 |
| 2013/0073892 A1* | 3/2013 | Whitlock ............ H04L 41/0631 714/4.1 |
| 2017/0237778 A1 | 8/2017 | Digiambattista et al. |
| 2017/0278066 A1* | 9/2017 | Chakravarty ...... G06Q 10/0633 |
| 2018/0159887 A1* | 6/2018 | DiGiambattista ..... G06F 21/577 |

OTHER PUBLICATIONS

"International Search Report and Written Opinion Issued in PCT Patent Application No. PCT/US2019/039478", dated Sep. 18, 2019, 26 Pages.

* cited by examiner

*Primary Examiner* — Jason K Gee
(74) *Attorney, Agent, or Firm* — Christopher J. Volkmann; Kelly, Holt & Christenson, PLLC

(57) ABSTRACT

A set of high level test logic is configured to include a set of insertion points. The high-level test logic can be controlled to insert test conditions into a data center configuration. It can also be configured to execute remediation actions that are to be taken, and validation actions to be performed in order to determine whether the remediation action works against the test conditions. Different instances of the high-level test logic can be configured for different environments and different test conditions.

20 Claims, 8 Drawing Sheets

TESTING INSTRUMENTATION FOR INTRUSION REMEDIATION ACTIONS

BACKGROUND

Computing systems are currently in wide use. Some computing systems are remote computing systems that host services that can be accessed by users or tenants (such as organizations).

By way of example, one such computing system is a data center. Data centers are often deployed in a facility that houses computer systems and various associated components, such as telecommunication systems and storage systems. The computing systems are often deployed on networked computer servers (or machines) and include storage that organizations and individuals use to organize and process large amounts of data, and to store that data. The data centers can host applications that are served by the networked computer servers.

Because data centers often host crucial information for various organizations, they are also often a target of surreptitious intrusion. The surreptitious intrusions can be from external sources or from internal sources, such as disgruntled employees.

In order to address such malicious activity, various systems have been developed to detect malicious events in a data center. Such events may include malicious actions that tend to indicate that the data center has been surreptitiously accessed by an unauthorized user. These types of accesses are often called surreptitious or malicious penetration events. Similarly, in order to protect the information stored in data centers, remediation tooling has also been developed that performs a remediation action when a surreptitious penetration event has been detected.

By way of example, some malicious actions include establishing a link to an external IP address. This is often done in an attempt to download information from the data center to the external IP address (or to steal that information). Thus, systems have been developed that detect this type of action as a malicious action. It is indicative of a surreptitious penetration event. In addition, remediation systems have been developed that attempt to block that connection, or to disconnect the data center from the external IP address. The tooling that has been developed to remedy the malicious actions can be automated tooling or manual tooling.

It is also common for one or more data centers to be configured to be setup in different environment configurations. For instance, some tenants may want their data center assets configured according to one configuration, while other tenants may want their data center assets to be configured according to a different configuration. Thus, data centers can be setup in different "environments" that reflect these different types of configurations.

The discussion above is merely provided for general background information and is not intended to be used as an aid in determining the scope of the claimed subject matter.

SUMMARY

A set of high level test logic is configured to include a set of insertion points. The high-level test logic can be controlled to insert test conditions into a data center configuration. It can also be configured to execute remediation actions that are to be taken, and validation actions to be performed in order to determine whether the remediation action works against the test conditions. Different instances of the high-level test logic can be configured for different environments and different test conditions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
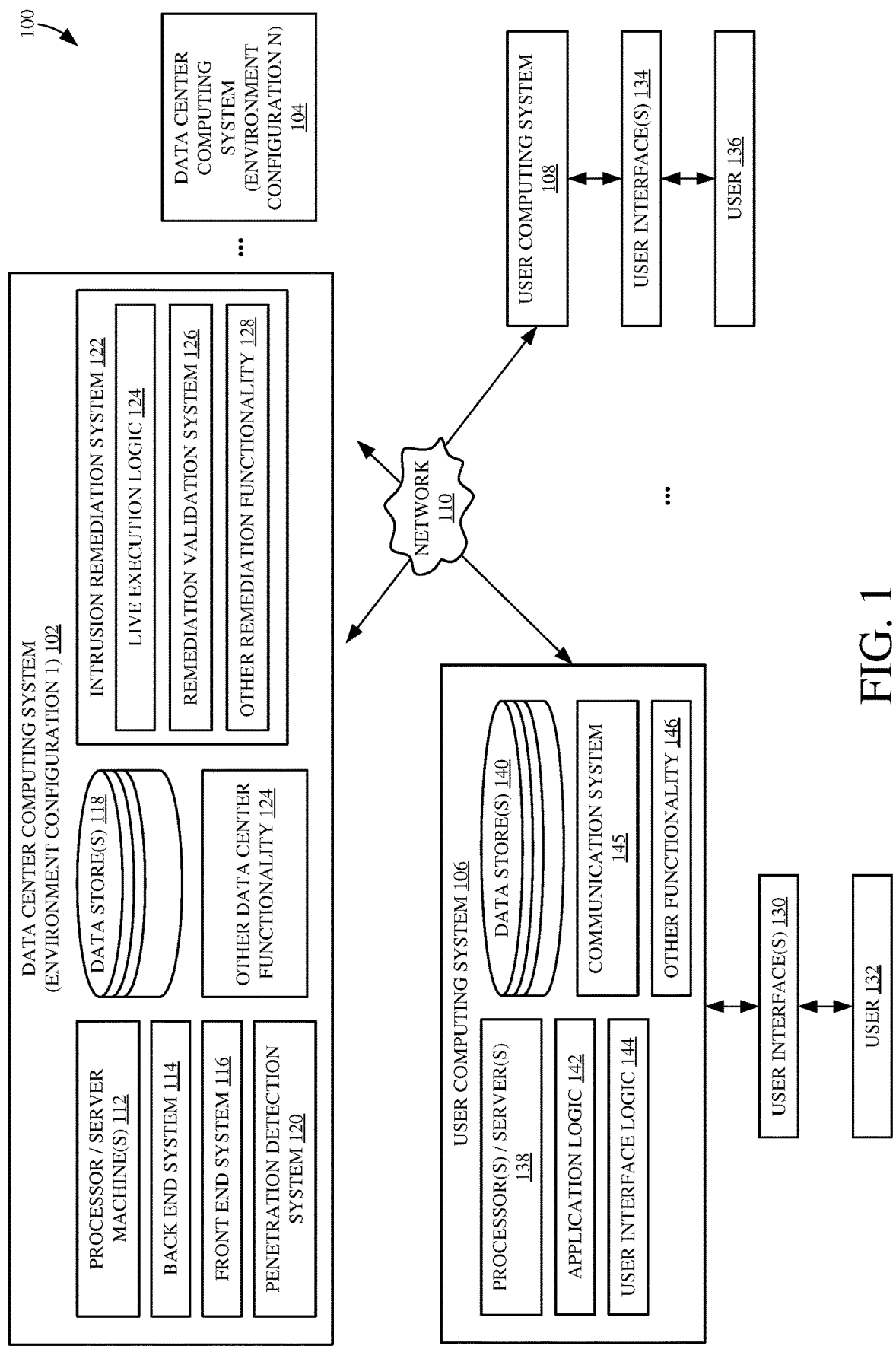
FIG. 1 is a block diagram of one example of a computing system architecture.

FIG. 1 shows one example of a computing system architecture 100. Architecture 100 illustratively includes one or more data center computing systems 102-104 that have different configurations such as environment configuration 1 (in system 102)-environment configuration n (in system 104), respectively.

FIG. 1 also shows that one or more user computing systems 106-108 are connected to the data center computing systems 102-104 over network 110. Therefore, network 110 can be a wide area network, a local area network, a near field communication network, a cellular communication network, or a wide variety of other networks or combinations of networks.

In the example shown in FIG. 1, data center computing systems 102-104 can be similar or different. For purposes of the present description, it will be assumed that they are similar so that only data center computing system 102 is described in more detail. Data center computing system 102 illustratively includes a plurality of different processor/server machines 112, a back end system 114, a front end system 116, data store 118, penetration detection system 120, intrusion remediation system 122, and it can include a wide variety of other data center functionality 124. Front end system 116 illustratively exposes an interface that can be accessed by the various user computing systems 106-108, in order to access the functions, applications and data stored on, and/or hosted by, data center computing system 102. Back end system 114 illustratively interacts with data store 118 based upon the inputs received from the users through front end system 116. Back end computing system 118 can also perform a wide variety of automated functions as well.

In one example, the front end system 116 and back end system 114 are implemented by the processor/server machines 112. The machines 112 can be separate computers, but networked, with their own memory, processors, etc.

Penetration detection system 120 is illustratively configured to detect malicious activity, or malicious events, that may be indicative of a surreptitious access (or surreptitious penetration event) to data center computing system 102 (such as a surreptitious penetration in order to perform some types of malicious activity, by an unauthorized person). There are a variety of different types of penetration detection systems that can be used, and that detect different types of malicious activities that may be indicative of a surreptitious penetration events. They illustratively generate alerts and output signals indicative of the detected activity. In one example, the outputs can be provided to an administrative user computing system so that remediation actions can be taken. In another example, the remediation actions can be taken automatically.

Intrusion remediation system 122 illustratively includes live execution logic 124, remediation validation system 126, and it can include a wide variety of other remediation functionality 128. The live execution logic 124 illustratively runs during the normal operation of data center computing system 102. When it receives a signal from penetration detection system 120 that a surreptitious penetration event (or activity indicative of such an event) has been detected, it illustratively performs remediation actions automatically, or it can be controlled by an administrative user to perform remediation actions.

In either of these examples, intrusion remediation system 122 illustratively includes functionality and instrumentation that can be controlled in order to respond to, and remedy, the malicious activity. By way of example, intrusion remediation system 102 may receive a signal from penetration detection system 120 indicating that a link has been created from data center computing system 102 to an external IP address. In that case, intrusion remediation system 122 may include instrumentation that sends an alert to an administrative computing system so that an administrative user can disconnect that link. In another example, intrusion remediation system 122 includes instrumentation that, when triggered by penetration detection system 120, automatically blocks the link to the external IP address, or disconnects data center 102 from that external IP address. It also illustratively notifies an administrative user of the actions that have taken place (both the malicious activity and the remediation actions that have been performed).

In current systems, it can be difficult to tell whether the remediation actions that were performed actually remedied the surreptitious activity that was detected. This can be especially true where the remediation actions are taken automatically. Thus, remediation validation system 126 can be configured to validate that the remediation actions that are to be performed in response to detected surreptitious penetration events (or activity that is indicative of such events) actually works.

Remediation validation system 126 is described in greater detail below with respect to FIGS. 2-5. Briefly, however, it includes logic that is scheduled to run on data center computing system 102 continuously, periodically, intermittently, based on other scheduling criteria, or in other ways. It selects a set of machines 112 and configures them in an isolated environment so that tests can be conducted on those machines without affecting the actual runtime performance of, and data and applications on, data center computing system 102. It then sets up test pre-conditions to reflect a scenario that the remediation actions are remediating against, and it runs the remediation actions in that isolated environment. It then validates whether the remediation actions resulted in the desired outcome. For instance, where the pre-condition is that the isolated environment has been connected to an external IP address, then the remediation action will be to block that connection, and the validation logic determines whether the connection has actually been blocked (e.g., the remediation validation logic may attempt to connect to the external IP address over the connection and, if unsuccessful, indicates that the remediation action performed as desired).

Remediation validation system 126 then generates an output to an administrative computing system indicative of the results of the validation or test of the remediation action. Again, one example of remediation validation system 126 is described in greater detail below.

FIG. 1 also shows that, in one example, user computing system 106 generates one or more user interfaces 130 for interaction by user 132. User 132 illustratively interacts with user interfaces 130 in order to control and manipulate user computing system 106 and some portions of data center computing system 102 or data center computing system 104, or both. Similarly, FIG. 1 shows that user computing system 108 generates user interfaces 134 for interaction by user 136. User 136 illustratively interacts with user interfaces 134 in order to control and manipulate computing system 108 and some portions of data center computing system 102 or data center computing system 104, or both data center computing systems 102 and 104.

It will be noted that one or more of user computing systems 106-108 can be administrative user computing systems or other computing systems that can be used by administrative users or other users to perform functions (such as security functions, maintenance functions, or other functions) on the data center computing systems 102-104. In addition, one or more of user computing systems 106-108 can be computing systems that are deployed in an organization or tenant where users interact with those computing systems in order to manipulate applications and data on the data center computing systems 102-104. Both of these architectures are contemplated herein.

User computing systems 106-108 can be similar or different. For purposes of the present discussion it will be assumed that they are similar so that only user computing system 106 is described in more detail. User computing system 106 illustratively includes one or more processors or servers 138, data store 140, application logic 142, user interface logic 144, communication system 145, and it can include other functionality 146. Application logic 142 can be a client component of applications that are hosted in the data center computing systems 102-104, or it can be logic that runs separate applications. User interface logic 144 illustratively generates user interfaces 130 and detects user interaction with user interfaces 130. It can provide an indication of those interactions to other components of user computing system 106 or to other items in architecture 100 over network 110. Communication system 145 is illustratively configured to communicate with other items in architecture 100 over network 110. Therefore, the type of network 110 that user computing system 106 is connected to will determine the type of communication system 145 that is used to communicate over that network.

Figure 2:
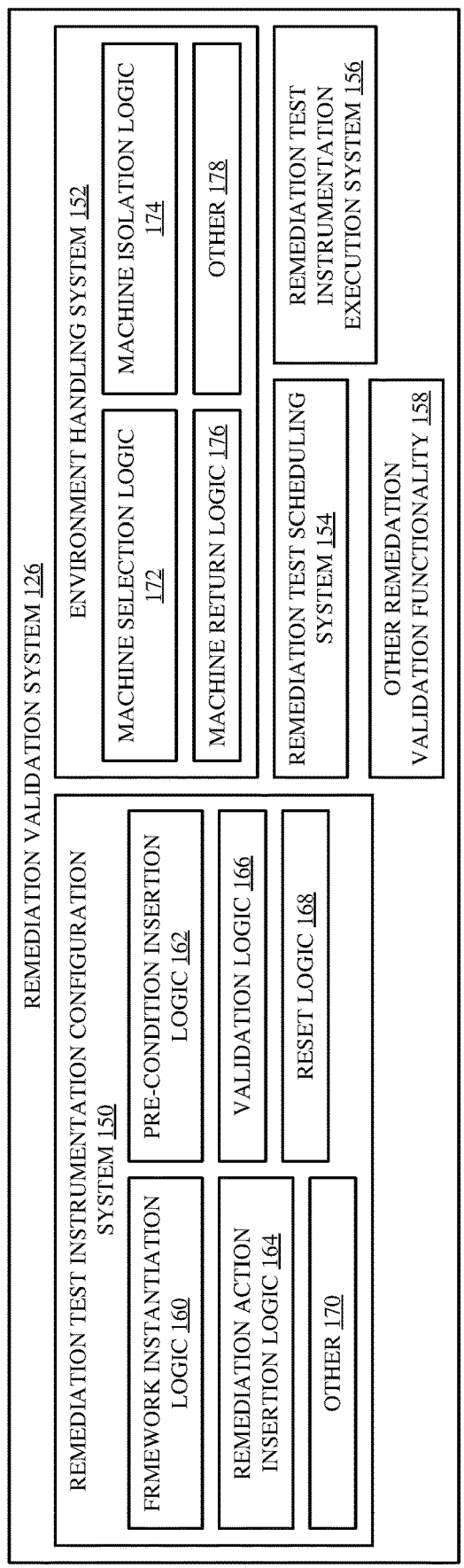
FIG. 2 is a block diagram showing one example of a remediation validation system in more detail.

FIG. 2 is a block diagram showing one example of remediation validation system 126 in more detail. Remediation validation system 126 illustratively includes remediation test instrumentation configuration system 150, environment handling system 152, remediation test scheduling system 154, remediation test execution system 156, and it can include a wide variety of other remediation validation functionality 158. Remediation test instrumentation configuration system 150 (or instrumentation configuration system 150) illustratively includes framework instantiation logic 160, pre-condition insertion logic 162, remediation action insertion logic 164, validation logic 166, reset logic 168 and it can include other items 170. Environment handling system 152 illustratively includes machine selection logic 172, machine isolation logic 174, machine return logic 176, and it can include other items 178. Before describing the operation of remediation validation system 126 in more detail, a brief description of some of the items in system 126 and their operation, will first be provided.

Remediation test instrumentation configuration system 150 illustratively provides a framework by which particular remediation actions, that are designed to remedy various surreptitious activities or conditions, can be validated. Therefore, framework instantiation logic 160 first detects a user input indicating that a user wishes to configure a set of test logic or validation logic to validate one or more remediation actions. It then instantiates the remediation test instrumentation (or framework). In one example, the remediation test instrumentation (or framework) is a set of high level test logic that has various insertion points where scenario-specific (e.g., malicious activity-specific or remediation action-specific) items can be inserted in order to configure the high-level code to test logic to validate various remediation actions to determine whether they actually remedied test conditions that are set up. The high-level code can be, for example, a base class that can be configured with the remediation action-specific logic.

Pre-condition insertion logic 162 illustratively generates a user interface that allows a user to insert pre-conditions (or test conditions) that will be setup in an environment where the remediation action is to be tested. There may not be pre-conditions that need to be setup, but if there are, they can be inserted using pre-condition insertion logic 162.

Remediation action insertion logic 164 illustratively generates a user interface that allows a user to insert or identify the particular remediation actions that are to be triggered or that will be taken when the validation is performed. For example, they can identify the remediation actions that are taken by the intrusion remediation system 122 in response to the test conditions, and that are to be validated or tested.

Validation logic 166 includes logic that determines whether the remediation actions actually remedied or addressed the conditions that they were intended to address. For example, if the pre-condition that is to be remedied is that a link has been setup between the environment to be tested and an external IP address, and the remediation action is to block that link or connection, then validation logic 166 will perform one or more actions to determine whether the remediation action was successful in blocking the connection. This is just one example.

Validation logic 166 also illustratively generates an output indicative of the validation results. The output can take a wide variety of forms, some of which are described in greater detail below.

Reset logic 168 resets the environment being tested to its original state so that it can be returned to the production environment, after it is tested.

Environment handling system 152 illustratively sets up the environment to be tested in a particular data center where system 126 is deployed. Machine selection logic 172 illustratively selects the set of machines 112 that are to be tested. They are illustratively a subset of the machines in the data center computing system 102 so system 102 continues to function normally, even during the test. The machines can be selected randomly, on a rotating basis, or in other ways. Machine isolation logic 174 sets up an isolated environment. It configures the selected machines so that they are isolated from the rest of data center computing system 102. This is because some of the testing that will be performed or some of the test pre-conditions, or the remediation actions, may be destructive in nature. Therefore, the machines are isolated from the remaining environment in computing system 102 so that those destructive actions do not destroy or damage any of the production data, applications, etc.

Machine return logic 176 illustratively configures the selected machines so that they can be returned and used in the production environment in the data center where they are deployed, after the validation is performed.

Remediation test scheduling system 154 can be used to schedule remediation validation system 126 to run the configured test instrumentation on a regular basis. For instance, it can be configured to run it continuously, periodically, intermittently, based upon one or more different triggers, or based upon other criteria.

Remediation test execution system 156 actually runs the configured test logic that is configured using remediation test configuration system 150. It is triggered by remediation test scheduling system 154 to run it at desired times (such as continuously, periodically, intermittently, etc.).

Figure 3:
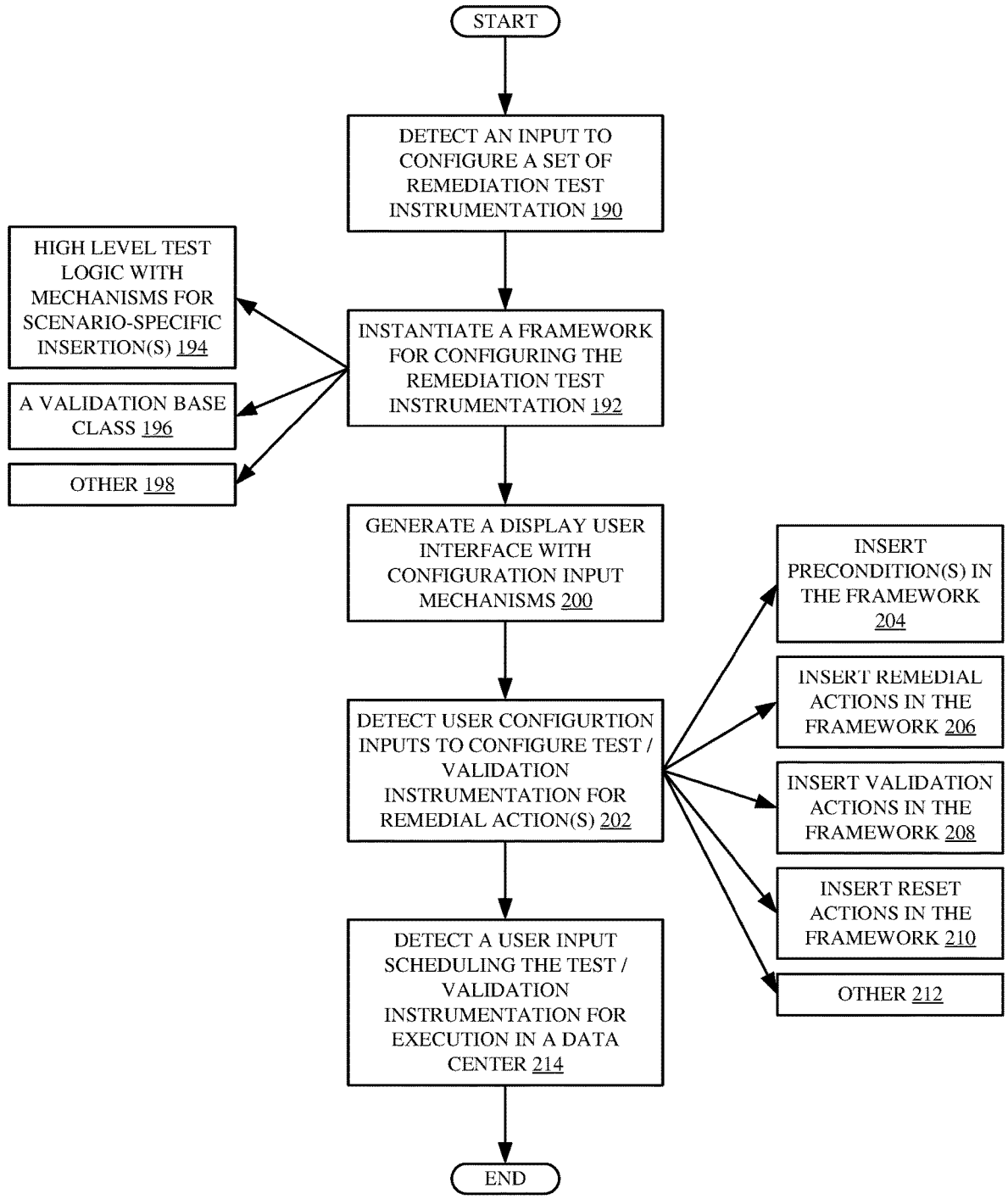
FIG. 3 is a flow diagram illustrating one example of the operation of a remediation test configuration system in configuring remediation action-specific test instrumentation.

FIG. 3 is a flow diagram showing one example of the operation of remediation test instrumentation configuration system 150 in configuring a set of test logic or instrumentation to perform a test or validation of one or more various remediation actions. Framework instantiation logic 160 first detects an input to configure a set of remediation test instrumentation. This is indicated by block 190 in the flow diagram of FIG. 3. For instance, an administrative user, or a user with security permissions that enable him or her to setup test instrumentation, illustratively authenticates himself or herself to remediation validation system 126 and provides an input indicating that he or she wishes to configure the remediation test instrumentation.

Framework instantiation logic 160 then instantiates a framework for configuring the remediation test instrumentation. This is indicated by block 192. In one example, logic 160 instantiates a set of high-level test logic with mechanisms for inserting remediation action-specific insertions so that various remediation actions, that are triggered in response to malicious activity, can be tested and validated. This is indicated by block 194. The high-level test logic may be a validation base class that has methods that can be called to insert the remediation action-specific information (such as the pre-conditions, remediation actions, validation actions, etc.). Instantiating a validation base class is indicated by block 196. The framework can be instantiated in other ways as well, and this is indicated by block 198.

Framework instantiation logic 160 then generates a display user interface with configuration input mechanisms that allow the user to configure the framework to validate various, specific, remediation actions. This is indicated by block 200 in the flow diagram of FIG. 3. In one example, the configuration input mechanisms can simply allow the user to select from a menu of configuration inputs. In another example, the user can type or otherwise insert the configuration inputs into the instantiated framework. These and other architectures are contemplated herein.

Framework instantiation logic 160 then detects user configuration inputs to configure the test/validation instrumentation for one or more remedial actions. This is indicated by block 202.

By way of example, pre-condition insertion logic 162 illustratively detects the insertion of pre-conditions that will be established in the environment to be tested. This is indicated by block 204. Remedial action insertion logic 164 illustratively detects user inputs inserting, or identifying, the remedial actions that are to be validated, in the framework. This is indicated by block 206. Validation logic 166 illustratively detects user inputs inserting validation actions, that are to be executed or performed, in order to validate the remedial actions. This is indicated by block 208.

Reset logic 168 illustratively detects user inputs inserting reset actions in the framework, that are to be performed in order to place the environment that was tested back into its original condition so that it can be returned to a production environment. This is indicated by block 210. Detecting user configuration inputs to configure the test/validation instrumentation can be done in a wide variety of other ways as well, and this is indicated by block 212.

Once the remediation test instrumentation has been configured, it can be stored for use in a variety of different ways. In one example, remediation test scheduling system 154 detects a user input scheduling the test/validation instrumentation for being run or executed in a particular data center. The test/validation instrumentation can be reused in various environments, or various different data centers. Instances of the configured instrumentation can be scheduled to run differently (e.g., at different times, under different conditions or in response to different triggers) in the different environments or data centers. Detecting a user input scheduling the test/validation instrumentation for execution in a data center is indicated by block 214 in the flow diagram of FIG. 3.

Figure 4:
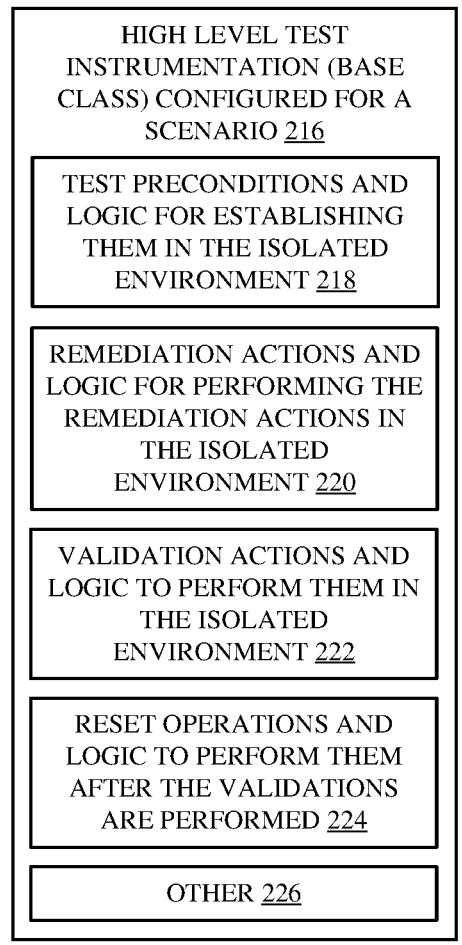
FIG. 4 is a block diagram showing one example of high-level test instrumentation that has been configured to test and validate a remediation action.

FIG. 4 shows one example of a set of high-level test logic or instrumentation 216 that has been configured to test or validate a specific set of remedial actions. In one example, the high-level test instrumentation 216 is a base class that is configured for a certain scenario (e.g., to test a certain set of remedial actions) that are to be tested. Thus, in one example, instrumentation 216 includes test pre-conditions, and logic for establishing them, in an isolated environment that is to be tested. This is indicated by block 218. It also illustratively includes remediation actions (or it identifies the remediation actions). It can also include logic for performing the remediation actions in the isolated environment, or for calling those remediation actions so that they can be tested. It can also include other information. This is indicated by block 220.

Instrumentation 216 also illustratively includes the validation actions (or it identifies those actions) and logic to perform them, or call them, in the isolated environment. This is indicated by block 222. Instrumentation 216 also illustratively includes reset operations and logic to perform those operations after the validations are performed, in the isolated environment. This is indicated by block 224. The high-level test instrumentation 216 can be configured to include other items as well.

Figure 5A:
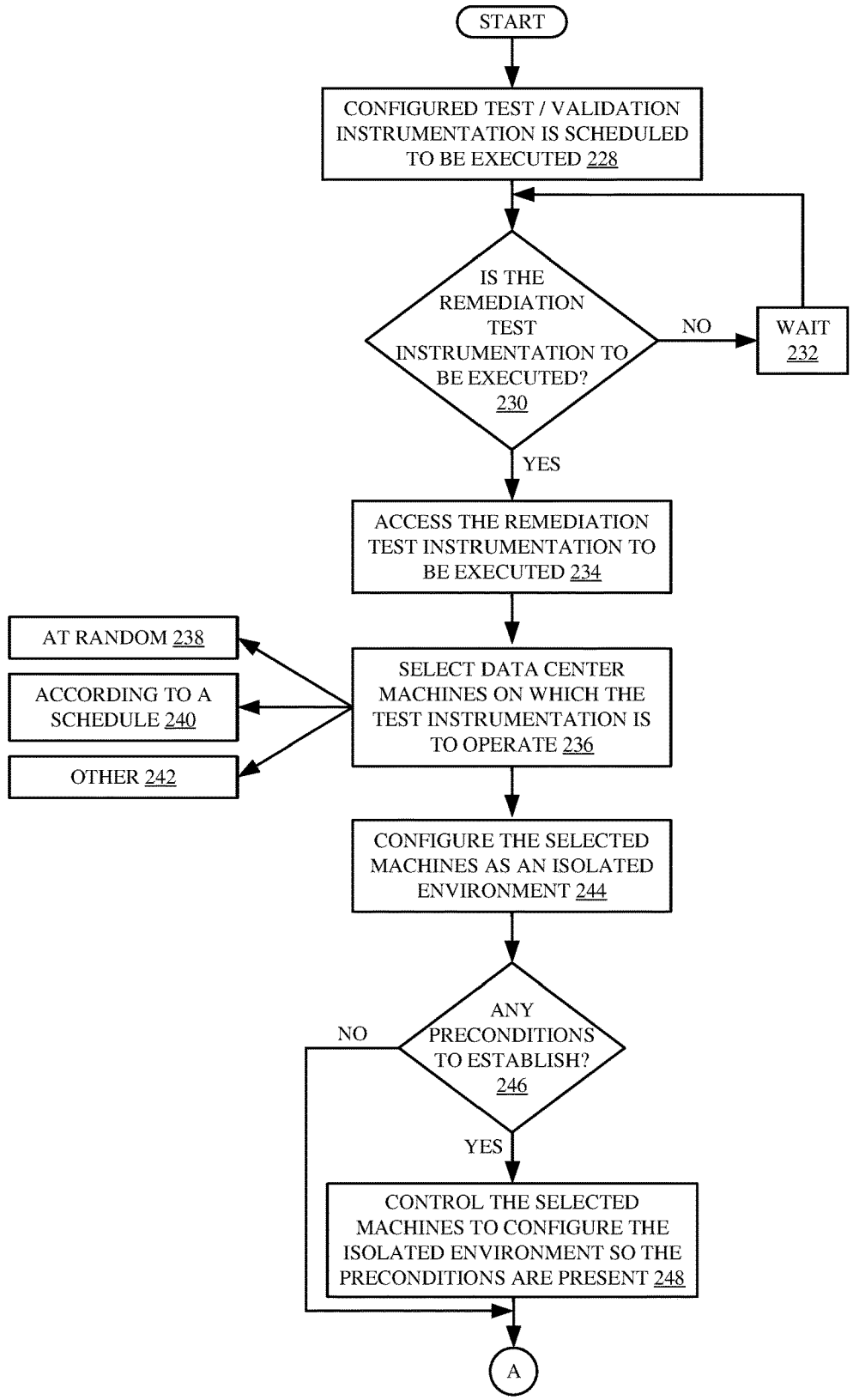
FIGS. 5A and 5B (collectively referred to herein as FIG. 5) show a flow diagram illustrating one example of the operation of the remediation validation system in executing the test instrumentation.
Figure 5B:
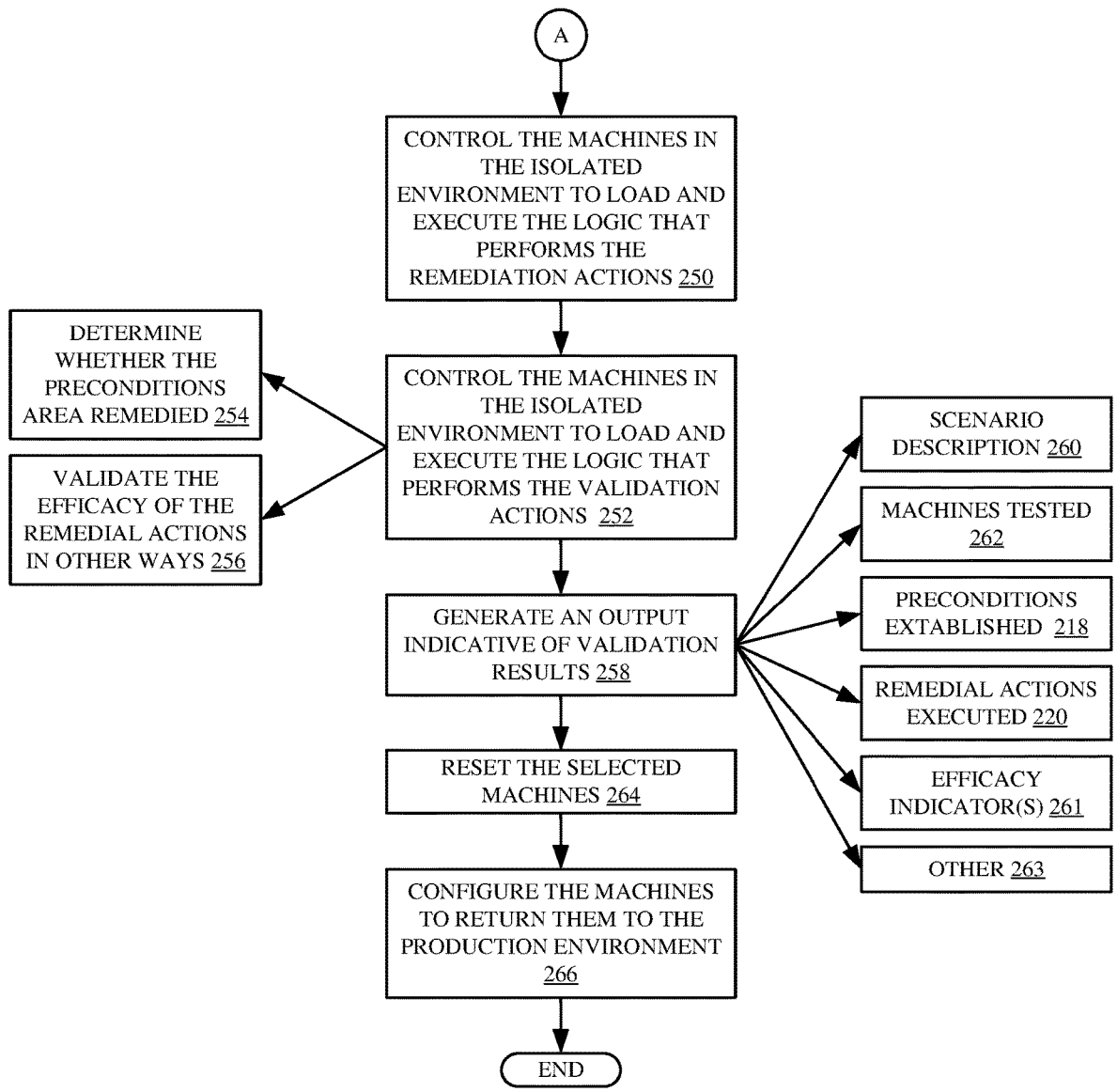

FIGS. 5A and 5B (collectively referred to herein as FIG. 5) illustrate a flow diagram showing one example of the operation of remediation validation system 126 in testing or validating a set of remediation actions in data center computing system 102. It is first assumed that the test/validation instrumentation 216 is scheduled to be executed in the data center computing system 102. Thus, the instrumentation 216 has been configured to test for the efficacy of a certain set of remediation actions, and it has been scheduled so that it is to run at a particular time, on a periodic basis, continually, or in response to other triggers. This is indicated by block 228 in the flow diagram of FIG. 5.

Remediation test instrumentation execution system 156 then determines whether it is time to run the remediation test instrumentation 216. This is indicated by block 230. Again, as discussed above, it may be determined that it is time to run the remediation test instrumentation 216 based on elapsed time since it was last executed, based on a number of operations that have been performed in the environment since it was last executed, it can be run continuously, or the determination as to whether the instrumentation should be run can be done in other ways as well. If it is not time to run the remediation test instrumentation 216, then system 156 waits, as indicated by block 232, until it is time. However, if, at block 230, it is determined that it is time to run the test instrumentation 216, then instrumentation execution system 156 accesses the remediation test instrumentation 216 that has been configured, and that is to be executed at this time. This is indicated by block 234. It generates a signal to environment handling system 152 and controls machine selection logic 172 to select set of data center machines 112, on which the test instrumentation is to operate. This is indicated by block 236. The machines that are selected are illustratively a subset of the machines 112 in computing system 102 and may be selected at random, as indicated by block 238. They may be selected according to a schedule (such as a rotating schedule where all machines are selected once before they are selected a second time). This is indicated by block 240. The machines may be selected in a wide variety of other ways as well (such as machines that may have a higher propensity to fail, etc.). Selecting the machines in other ways or based on other triggering criteria is indicated by block 242.

Machine isolation logic 174 then controls the selected machines so that they are isolated from the remainder of data center computing system 102. Configuring the selected machines as an isolated environment is indicated by block 244.

Execution system 156 then begins operating the configured instrumentation 216 to validate the remedial actions for which it was configured. Thus, if there are any test pre-conditions 218, then execution system 156 executes the logic for establishing those pre-conditions in the isolated environment setup in block 244. Determining whether there are any pre-conditions to establish in the isolated environment and controlling the selected machines to configure the isolated environment so the pre-conditions are present are indicated by blocks 246 and 248, respectively, in the flow diagram of FIG. 5.

Execution system 156 then accesses the remediation actions 220 that are set out, or identified, in the test instrumentation 216. It controls the selected machines in the isolated environment to load and execute the logic that performs the remediation actions. This is indicated by block 250. By way of example, if one of the pre-conditions is that the isolated environment is connected to an external IP address, then the remediation action may be to break that connection, or to block it in another way. This is just one example.

Execution system 156 then controls the machines in the isolated environment to load and execute the logic that performs the validation actions 222 set out in the test instrumentation 216. This is indicated by block 252 in the flow diagram of FIG. 5. For instance, the validation actions may determine whether the pre-conditions are remedied.

Continuing with the example discussed above, if one of the pre-conditions is to have the isolated environment connected to an external IP address, then the validation actions 222, when executed, will determine whether that connection has been broken or blocked. Determining whether the pre-conditions are remedied is indicated by block 254 in the flow diagram of FIG. 5. The validation actions 222 can validate the efficacy of the remedial actions in a wide variety of other ways as well, and this is indicated by block 256.

Execution system 156 then generates an output indication that is indicative of the validation results. This is indicated by block 258. In one example, the output can include a scenario description 260 which describes the scenario that is being tested. For instance, the scenario may indicate that the remediation actions are taken to disconnect a surreptitious connection to an external IP address. It may describe the scenario in a wide variety of other ways as well.

The output may identify the particular machines tested in the data center computing system 102. This is indicated by block 262. It may identify information contained in the test instrumentation 216. For instance, it may identify the pre-conditions 218 that were established. It may identify the remediation actions 220 that were taken. It may provide an efficacy indicator 261 that indicates the efficacy of those remedial actions (such as whether they remedied what they were supposed to remedy). The results can include a wide variety of other information 263 as well.

Once the validation instrumentation has completed its operations, then reset logic 168 resets the selected machines so that they can be used in the production environment of data center computing system 102. Resetting the selected machines is indicated by block 264 in the flow diagram of FIG. 5.

By way of example, it may be that the pre-conditions that were set in the machines must be reset. It may be that the machines were configured in an isolated environment in other ways that need to be reset as well. All of these and other reset operations are contemplated herein.

Machine return logic 176 in environment handling system 152 then configures the selected machines to return them to the production environment. This is indicated by block 266.

It can thus be seen that the instrumentation discussed herein provides significant advantages and enhances the security of the computing system on which it is deployed. The instrumentation functionally validates remediation actions against test conditions to enhance the likelihood that a remediation action works as designed within a specific environment. The validation instrumentation is automated to continuously test and target multiple environments and roles. The instrumentation can be used to continuously test across environments to determine whether the incident response tooling (or intrusion remediation system 122) is operating properly, even as the data center service changes and expands over time. It also illustratively generates a visualization of remediation action performance that can easily alert an administrative user or engineer when remediation tooling fails. This enhances the ability to swiftly fix the remediation instrumentation.

It will be noted that the above discussion has described a variety of different instrumentation, systems, components and/or logic. It will be appreciated that such instrumentation, systems, components and/or logic can be comprised of hardware items (such as processors and associated memory, or other processing components, some of which are described below) that perform the functions associated with the instrumentation, systems, components and/or logic. In addition, the instrumentation, systems, components and/or logic can be comprised of software that is loaded into a memory and is subsequently executed by a processor or server, or other computing component, as described below. The instrumentation, systems, components and/or logic can also be comprised of different combinations of hardware, software, firmware, etc., some examples of which are described below. These are only some examples of different structures that can be used to form the instrumentation, systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
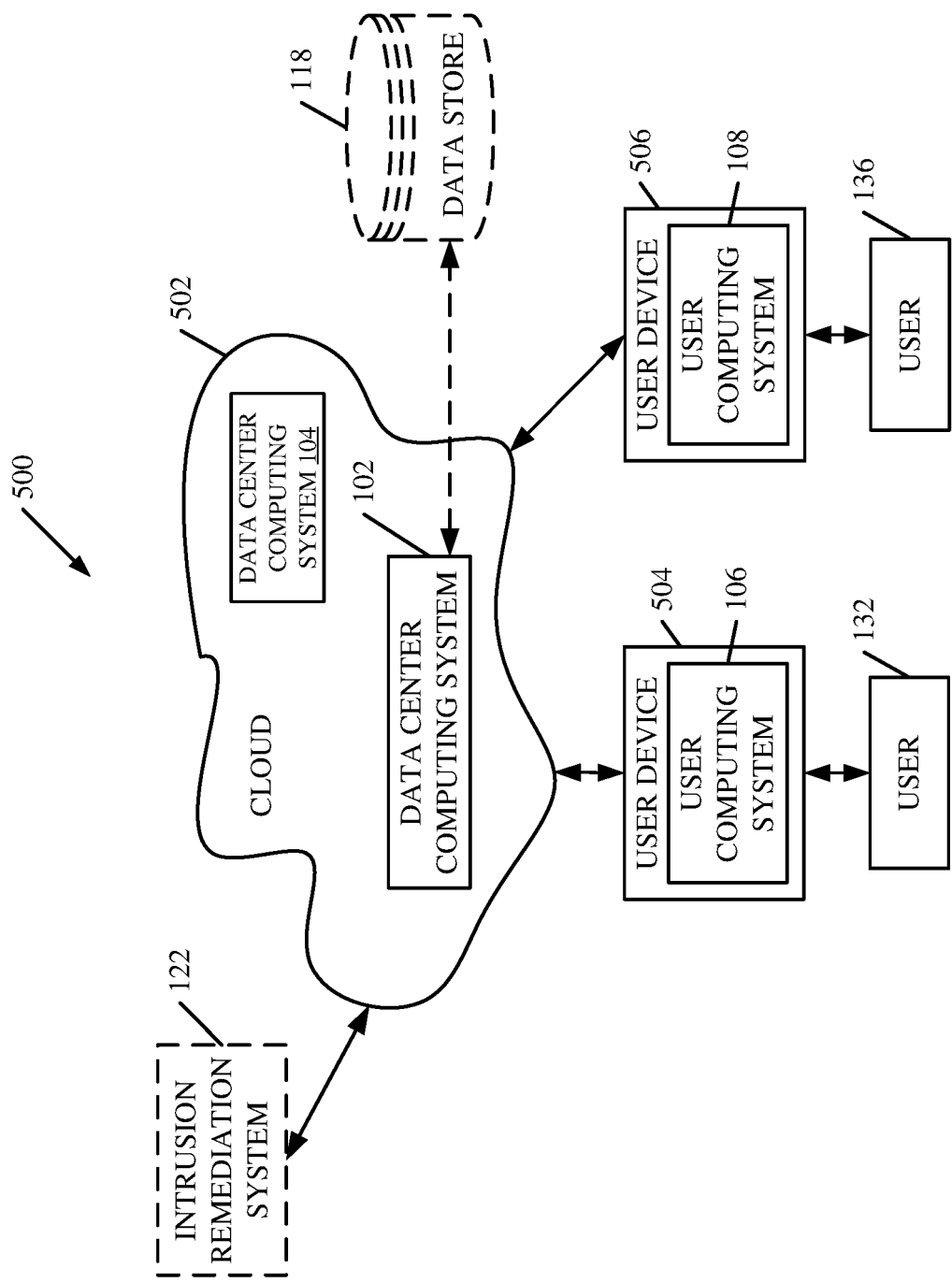
FIG. 6 is a block diagram showing one example of the architecture illustrated in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that data center computing systems 102 and 104 can be located in cloud 502 (which can be public, private, or a combination where portions are public while others are private). Therefore, users 132 and 136 use user devices 504 and 506 to access those systems through cloud 502.

FIG. 6 also depicts another example of a cloud architecture. FIG. 6 shows that it is also contemplated that some elements of computing systems 102 and 104 can be disposed in cloud 502 while others are not. By way of example, data store 118 can be disposed outside of cloud 502, and accessed through cloud 502. In another example, intrusion remediation system 122 (or other items) can be outside of cloud 502. Regardless of where they are located, they can be accessed directly by devices 504 and 506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
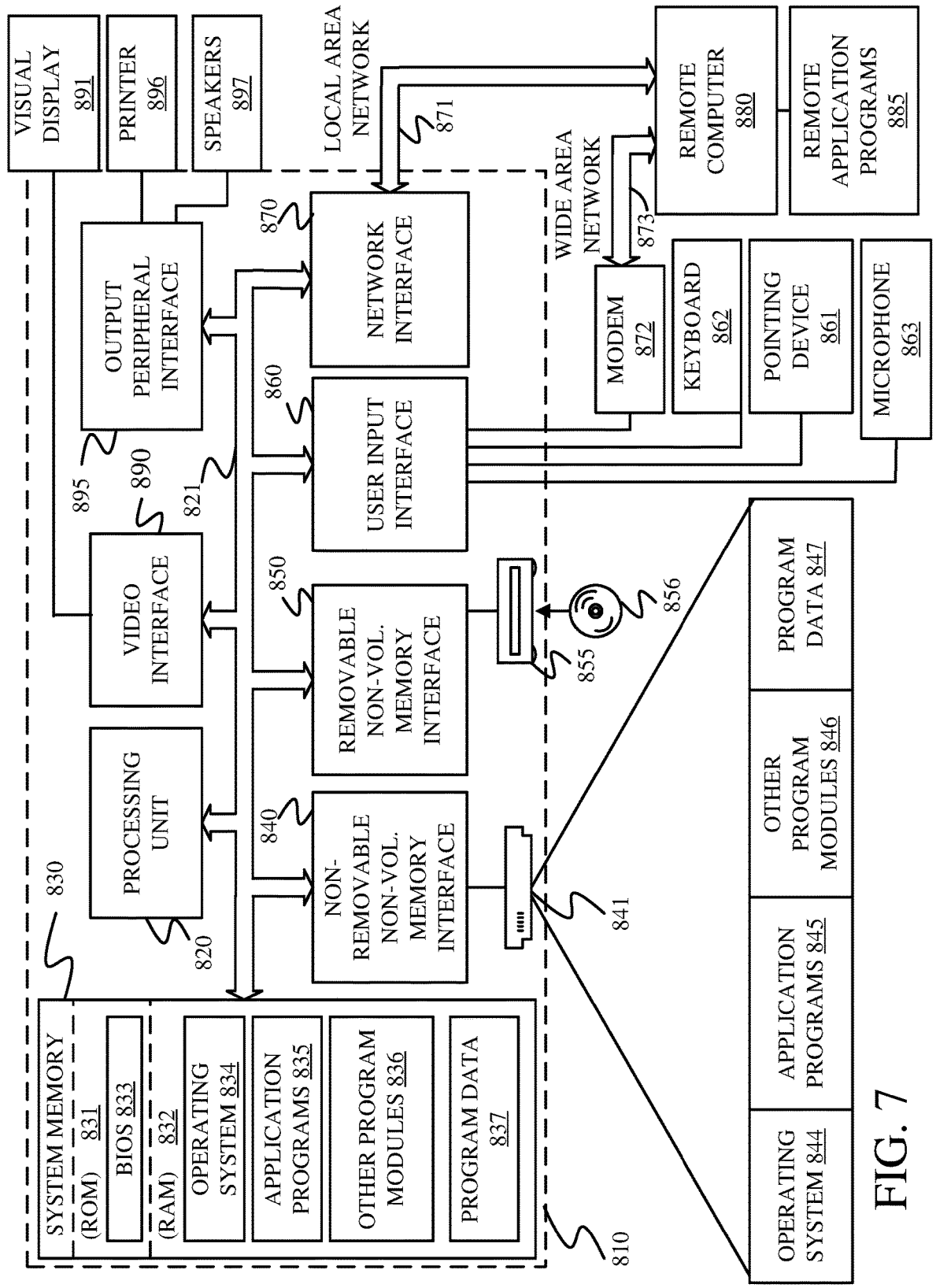
FIG. 7 is a block diagram showing one example of a computing environment that can be used in the architectures shown in the previous figures.

FIG. 7 is one example of a computing environment in which architecture 100, or parts of it, (for example) can be deployed. With reference to FIG. 7, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 7.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Example 1 is a computing system, comprising:

an instrumentation configuration system that receives a user configuration input and configures validation instrumentation, to obtain configured validation instrumentation, to validate a remedial action performed in the computing system in response to a detected malicious activity performed in the computing system;

an environment handling system that selects a set of machines in the computing system and configures the set of selected machines in an isolated environment, functionally isolated from other machines in the computing system;

a remediation test scheduling system that receives a user scheduling input identifying scheduling criteria, under which the configured validation instrumentation is to be run on the computing system, and to detect presence of the scheduling criteria; and an instrumentation execution system that automatically controls the configured validation instrumentation to validate the remedial action on the selected machines in the isolated environment based on the remediation test scheduling system detecting the presence of the scheduling criteria.

Example 2 is the computing system of any or all previous examples wherein the instrumentation configuration system comprises:

framework instantiation logic configured to instantiate validation framework logic that includes insertion logic that inserts remedial action-specific configuration information in the validation framework logic to obtain the configured validation instrumentation.

Example 3 is the computing system of any or all previous examples wherein the framework validation logic is configured to instantiate the validation framework logic as a validation base class that is configurable to include the remedial action-specific configuration information.

Example 4 is the computing system of any or all previous examples wherein the validation framework logic comprises:

remediation action insertion logic configured to identify the remedial action that is performed in the computing system in response to a detected malicious activity and that is validated by the configured validation instrumentation.

Example 5 is the computing system of any or all previous examples wherein the validation framework logic comprises:

validation logic configured to validate the remedial action by determining whether the remedial action performed a set of predefined steps in response to the detected malicious activity by generating an output indicative of a validation result that identifies whether the remedial action performed the set of predefined steps.

Example 6 is the computing system of any or all previous examples wherein the validation framework logic comprises:

reset logic configured to reset the set of selected machines to a configuration in which they can be returned to a production environment, after the validation logic validates the remedial action.

Example 7 is the computing system of any or all previous examples wherein the validation framework logic comprises:

test condition insertion logic that configures the selected set of machines in the isolated environment so a test condition, indicative of the malicious activity, is present in the isolated environment.

Example 8 is the computing system of any or all previous examples and further comprising:

validation logic configured to validate the remedial action by determining whether the test condition is eliminated from the isolated environment after the remedial action is performed.

Example 9 is the computing system of any or all previous examples wherein the environment handling system comprises:

machine selection logic configured to select the set of machines without regard to which machines were previously selected.

Example 10 is a computing system, comprising:

a malicious activity detection system, that detects malicious activity on the computing system, indicative of an unauthorized user obtaining access to the computing system;

an intrusion remediation system that executes an intrusion remediation action in response to detection of the malicious activity; and a remediation validation system that automatically generates an isolated computing environment in the computing system, sets a test condition in the isolated computing environment indicative of the malicious activity, and validates that the intrusion remediation system performs the intrusion remediation action in response to the test condition set in the isolated computing environment.

Example 11 is the computing system of any or all previous examples wherein the remediation validation system comprises:

a remediation test scheduling system configured to determine whether test execution criteria are met and, if so, generate a test execution signal.

Example 12 is the computing system of any or all previous examples wherein the remediation validation system comprises:

remediation test instrumentation configured to automatically set the test condition in the isolated environment based on the remediation test scheduling system generating the test execution signal; and test execution instrumentation configured to control the remediation test instrumentation to automatically set the test condition in the isolated environment based on the remediation test scheduling system generating the test execution signal.

Example 13 is the computing system of any or all previous examples wherein the remediation test instrumentation is configured to identify the intrusion remediation action to be executed based on the test condition.

Example 14 is the computing system of any or all previous examples wherein the remediation test instrumentation comprises validation logic, executed by the test execution instrumentation, to validate the intrusion remediation action.

Example 15 is a method of controlling a computing system, comprising:

detecting that a malicious intrusion remediation test scheduling criterion is met;

automatically selecting a set of machines in the computing system based on detection of the test scheduling criterion;

automatically configuring the selected set of machines to generate an isolated computing environment in the computing system;

controlling the selected set of machines to set a remediable test condition in the isolated computing environment indicative of a malicious intrusion into the computing system;

performing a predefined remediation action to remedy the test condition in the isolated computing environment;

automatically validating the predefined remediation action by determining whether the predefined remediation action remedied the remediable test condition in the isolated computing environment; and generating a validation output indicative of whether the predefined remediation action remedied the remediable test condition.

Example 16 is the method of any or all previous examples and further comprising:

returning the selected set of machines to a production environment in the computing system after automatically validating the predefined remediation action.

Example 17 is the method of any or all previous examples wherein automatically validating comprises:

accessing a configured base class, configured with remediation action-specific validation logic, based on the predefined remediation action to be validated; and executing the remediation action—specific validation logic.

Example 18 is the method of any or all previous examples and further comprising:

accessing the configured base class, configured with remediation action-specific reset logic; and executing the remediation action—specific reset logic to configure the selected set of machines to be returned to the production environment.

Example 19 is the method of any or all previous examples and further comprising:

scheduling automatic validation of the predefined remediation action to be performed repeatedly in the computing system.

Example 20 is the method of any or all previous examples wherein automatically selecting a set of machines in the computing system comprises:

automatically selecting the set of machines based on how recently the set of machines was last selected.

What is claimed is:

1. A computing system, comprising:
   at least one processor: and
   memory storing instructions executable by the at least one processor, wherein the instructions, when executed, cause the computing system to:
      configure validation instrumentation based on a configuration input,
         the configured validation instrumentation configured to validate a remedial action performed in the computing system in response to detected malicious activity in the computing system
      select a first machine from a plurality of machines in an execution environment;
      configure the first machine in an isolated environment, wherein the first machine is functionally isolated from a second machine in the plurality of machines;
      based on a user scheduling input, identify scheduling criteria, under which the configured validation instrumentation is to be run;
      based on detecting presence of the scheduling criteria, automatically run the configured validation instrumentation on the first machine in the isolated environment and validate the remedial action; and
      return the first machine to the execution environment.

2. The computing system of claim 1 Wherein the validation instrumentation includes validation framework logic comprising a plurality of insertion points configured to receive remedial action-specific configuration information, and wherein the instructions cause the computing system to:
configure the validation instrumentation based on the configuration input by inserting remedial action-specific configuration information in using the plurality of insertion points.

3. The computing system of claim 2 wherein the instructions cause the computing system to instantiate the validation framework logic as a validation base class that is configurable to include the remedial action-specific configuration information.

4. The computing system of claim 2 wherein the instructions cause the computing system to:
identify the remedial action that is
performed in the computing system in response to a detected malicious activity, and
validated by the configured validation instrumentation.

5. The computing system of claim 4 wherein the instructions cause the computing system to:
determine that the remedial action performed predefined steps in response to the detected malicious activity;
generate an output indicative of a validation result that identifies that the remedial action performed the predefined steps; and
validate the remedial action based on tie output.

6. The computer system of claim 5 wherein the execution environment comprises a production environment, and the instructions cause the computing system to:
after the validation of the remedial action,
reset the first machine to a particular configuration corresponding to the production environment, and
return the first machine to the production environment.

7. The computing system of claim 4 wherein the ructions cause the computing system to:
configure the first machine in the isolated environment so a test condition, indicative of the malicious activity, is present in the isolated environment; and
validate the remedial action by determining whether the test condition is eliminated from the isolated environment after the remedial action is performed.

8. The computing system of claim 1, wherein the computing system comprising an interface for a plurality of user computing systems to access the execution environment, and the execution environment comprises a plurality of server machines configured to receive end user data access requests and to host an application for the plurality of user computing systems, and
the instructions cause the computing system to:
select the first machine from the plurality of server machines in the execution environment.

9. The computing system of claim 1 wherein the instructions cause the computing system to:
select the first machine without regard to which machines were previously selected.

10. A computer-implemented method comprising:
configuring validation instrumentation based on a configuration input,
the configured validation instrumentation configured to validate a remedial action performed in a computing system in response to detected malicious activity in the computing system, the computing system comprising an interface for a plurality of user computing systems to access an execution environment that includes a plurality of machines configured to host an application for the plurality of user computing systems;
selecting a first machine from the plurality of machines in the execution environment;
configuring the first machine in an isolated environment, functionally isolated from a second machine in the plurality of machines;
based on a scheduling input, identifying scheduling criteria under which the configured validation instrumentation is to be run;
based on detecting presence of the scheduling criteria, automatically running the configured validation instrumentation on the first machine in the isolated environment and validating the remedial action; and
returning the first machine to the execution environment.

11. The computer-implemented method of claim 10, wherein the validation instrumentation includes validation framework logic comprising a plurality of insertion points configured to receive remedial action-specific configuration information, and further comprising:
configuring the validation instrumentation based on the configuration input by inserting remedial action-specific configuration information using the plurality of insertion points.

12. The computer-implemented method of claim 11, and further comprising:
identifying the remedial action that is
performed in the computing system in response to a detected malicious activity, and
validated by the configured validation instrumentation.

13. The computer-implemented method of claim 12, and further comprising:
determining that the remedial action performed predefined steps in response to the detected malicious activity;
generating an output indicative of a validation result that identifies that the remedial action performed the predefined steps; and
validating the remedial action based on the output.

14. The computer-implemented method of claim 10, and further comprising:
configuring the at least one machine in the isolated environment so a test condition indicative of the malicious activity, is present in the isolated environment.

15. The computer-implemented method of claim 14, and further comprising:
validating the remedial action by determining whether the test condition is eliminated from the isolated environment after the remedial action is performed.

16. A data center computing system comprising:
at least one processor; and
memory storing instructions executable by the at least one processor, wherein the instructions, when executed, cause the data center computing system to:
based on a configuration input, generate validation instrumentation that includes a test condition representing malicious activity in the data center computing system, the validation instrumentation configured to validate a remedial action performed in the computing system in response to the test condition;
based on scheduling input, identify a scheduling criterion under which the configured validation instrumentation is to be run;
based on detecting presence of the scheduling criterion, select a first machine from a plurality of server machines in a production environment, the plurality of server machines configured to receive end user data access requests and to service the end user data access requests using data center functionality;
configure the first machine in an isolated environment using the configured validation instrumentation so the test condition is present in the isolated environment, wherein the first machine is functionally isolated from other server machines in the production environment; automatically validate the remedial action on the first machine in the isolated environment based on a determination that the test condition is eliminated from the isolated environment after the remedial action is performed; and
after the validation of the remedial action,
reset the first machine to a particular configuration corresponding to the production environment, and
return the first machine to the production environment.

17. The data center computing system of claim 16, wherein the instructions cause the data center computing system to:
identify the remedial action that is
performed in the computing system in response to a detected malicious activity, and
validated by the configured validation instrumentation.

18. The data center computing system of claim 17, Wherein the instructions cause the data center computing system to:
determine that the. remedial action performed a set of predefined steps in response to the malicious activity;
generate an output indicative of a validation result that identifies that the remedial action performed the set of predefined steps; and
validate the remedial action based on the output.

19. The data center computing system of claim 16, wherein the instructions cause the data center computing system to:
configure the first machine in the isolated environment based on remedial action-specific configuration information.

20. The data center computing system of claim 19, wherein the instructions cause the data center computing system to:
instantiate validation framework logic that includes insertion logic that inserts the remedial action-specific con figuration information in the validation framework logic to obtain the configured validation instrumentation.

* * * * *